United States Patent
Siskindovich et al.

(10) Patent No.: US 10,952,555 B2
(45) Date of Patent: Mar. 23, 2021

(54) FOLDING TONGS

(71) Applicant: SABERT CORPORATION, Sayreville, NJ (US)

(72) Inventors: Yohanan Siskindovich, Glen Ridge, NJ (US); Stephen Ricci, Vorhees, NJ (US)

(73) Assignee: SABERT CORPORATION, Sayreville, NJ (US)

( * ) Notice: Subject to any disclaimer, the term of this patent is extended or adjusted under 35 U.S.C. 154(b) by 93 days.

(21) Appl. No.: 15/762,556

(22) PCT Filed: Sep. 22, 2015

(86) PCT No.: PCT/US2015/051489
§ 371 (c)(1),
(2) Date: Mar. 22, 2018

(87) PCT Pub. No.: WO2017/052513
PCT Pub. Date: Mar. 30, 2017

(65) Prior Publication Data
US 2020/0281382 A1 Sep. 10, 2020

(51) Int. Cl.
*A47G 21/10* (2006.01)
*A47J 43/28* (2006.01)

(52) U.S. Cl.
CPC ......... *A47G 21/10* (2013.01); *A47J 43/283* (2013.01)

(58) Field of Classification Search
CPC ........... A47G 21/10; A47J 43/283; B25B 9/02
USPC .................................. 294/16, 99.2
See application file for complete search history.

(56) References Cited

U.S. PATENT DOCUMENTS

| | | | |
|---|---|---|---|
| 528,257 A * | 10/1894 | Murray | |
| 1,715,088 A * | 5/1929 | Jones | C09F 1/00 530/228 |
| 2,376,135 A | 5/1945 | Frasher | |
| 3,259,415 A * | 7/1966 | Howard | A01K 97/18 294/99.2 |
| 3,392,727 A | 7/1968 | Hanlon | |
| 3,934,915 A | 1/1976 | Humpa | |
| 3,964,775 A | 6/1976 | Boyd | |
| 4,126,962 A | 11/1978 | Polcaro | |
| 4,728,139 A * | 3/1988 | Oretti | A47J 43/283 294/99.2 |
| 4,761,028 A | 8/1988 | Dulebohn | |
| D317,106 S * | 5/1991 | Kosurko | D7/686 |
| 5,019,091 A | 5/1991 | Porat et al. | |

(Continued)

OTHER PUBLICATIONS

International Preliminary Report on Patentability issued in the corresponding application.

*Primary Examiner* — Paul T Chin
(74) *Attorney, Agent, or Firm* — Cozen O'Connor

(57) ABSTRACT

Folding plastic tongs for serving food items are disclosed. The tongs have arms joined at a hinge and extending in a lengthwise direction from the hinge. A first protrusion extends from an inner surface of the first arm and a second protrusion extends from an inner surface of the second arm. The first protrusion and the second protrusion are configured to connect to each other to restrain an opening movement of the arms. Gripping portions are formed at ends of each of the arms. The hinge is configured to allow the arms to open to a position such that the first arm forms at least an obtuse angle with the second arm when the first protrusion and the second protrusion are not connected.

17 Claims, 11 Drawing Sheets

(56) References Cited

U.S. PATENT DOCUMENTS

| | | | | |
|---|---|---|---|---|
| 5,078,729 A * | 1/1992 | Eichhorn | ............... | A61B 17/50 |
| | | | | 294/99.2 |
| 5,355,295 A * | 10/1994 | Brennen | ............... | H02J 3/1814 |
| | | | | 363/40 |
| 5,899,356 A * | 5/1999 | Huisman | ................ | A47G 21/10 |
| | | | | 221/61 |
| D490,684 S * | 6/2004 | Settele | ........................... | D8/339 |
| 6,869,117 B1 * | 3/2005 | Blum | ..................... | A47G 21/10 |
| | | | | 294/106 |
| D532,932 S * | 11/2006 | Shih | .............................. | D28/55 |
| D546,141 S * | 7/2007 | Broome | ........................ | D7/686 |
| 7,287,791 B2 * | 10/2007 | Carolina | ..................... | A47G 21/10 |
| | | | | 294/16 |
| D576,846 S * | 9/2008 | Holcomb | ....................... | D7/672 |
| 7,448,660 B2 * | 11/2008 | Yamanaka | ............. | A47J 43/283 |
| | | | | 294/16 |
| D606,815 S * | 12/2009 | Gallop | ........................... | D7/686 |
| D810,522 S * | 2/2018 | Siskindovich | ................ | D7/686 |
| 2007/0284899 A1 | 12/2007 | Simons | | |

* cited by examiner

FOLDING TONGS

PRIORITY CLAIM

This is a U.S. national stage of application No. PCT/US2015/051489, filed on Sep. 22, 2015.

FIELD OF THE INVENTION

The disclosed embodiments relate to folding plastic tongs for serving food items. In particular, the disclosed embodiments relate to folding plastic tongs which open to a position in which the arms form at least an obtuse angle to allow efficient nesting of the tongs.

BACKGROUND OF THE INVENTION

The use of plastic disposable containers, trays, and utensils for packaging, distributing, food are widespread in the marketplace. Plastic tongs, in particular, are used to serve food items contained in various receptacles, including in plastic containers, and on plastic trays. Most conventional plastic tongs are not efficiently stackable for shipment purposes because they do not open to 180 degrees. Moreover, even tongs that open to 180 degrees are not efficiently nestable because they are not configured to allow a portion of the tongs to fit snugly inside a portion of an adjacent pair of tongs.

SUMMARY OF THE INVENTION

In one aspect, the present invention provides folding plastic tongs for serving food items. The tongs include a first arm and a second arm joined at a hinge and extending in a lengthwise direction from the hinge. The first and second arms have a non-planar shape in a cross-section transverse to the lengthwise direction, along at least a portion of a length of the first and second arms. A first protrusion extends from an inner surface of the first arm and a second protrusion extends from an inner surface of the second arm. The first protrusion and the second protrusion are configured to connect to each other to restrain an opening movement of the first and second arms, and may be further configured to disconnect to allow an opening movement of the first and second arms. Gripping portions are formed at ends of each of the first and second arms. The hinge is configured to allow the first and second arms to open to a position such that the first arm forms at least an obtuse angle with the second arm when the first protrusion and the second protrusion are not connected.

Embodiments of the present invention may include one or more of the following features.

A portion of the first protrusion may be configured to fit into a receptacle in the second protrusion, the first protrusion having one or more elements which form a snap connection with the receptacle in the second protrusion. The first and second arms each may include an opening formed in alignment with the first and second protrusions, respectively, such that a volume within each of the first and second protrusions is open to an outer surface of each of the first and second arms.

The tongs may be nestable with a second pair of tongs, when the arms are in a position in which the first arm forms an angle with the second arm of about 180 degrees, such that the first and second protrusions of the tongs fit within the corresponding volumes within the first and second protrusions of the second pair of tongs. The first protrusion may have an A-shaped member which extends so that a peak thereof is pointed in a direction of the second protrusion, and the second protrusion may have an A-shaped member which extends so that a peak thereof is pointed in a direction of the first protrusion. The peak of the first protrusion may be configured to fit into a slot in the peak of the second protrusion. The first protrusion may have tabs at the peak thereof which form a snap connection with an edge of the slot.

BRIEF DESCRIPTION OF THE DRAWINGS

The above and/or other aspects and advantages will become more apparent and more readily appreciated from the following detailed description of the disclosed embodiments taken in conjunction with the accompanying drawings of which.

DETAILED DESCRIPTION

Figure 1:
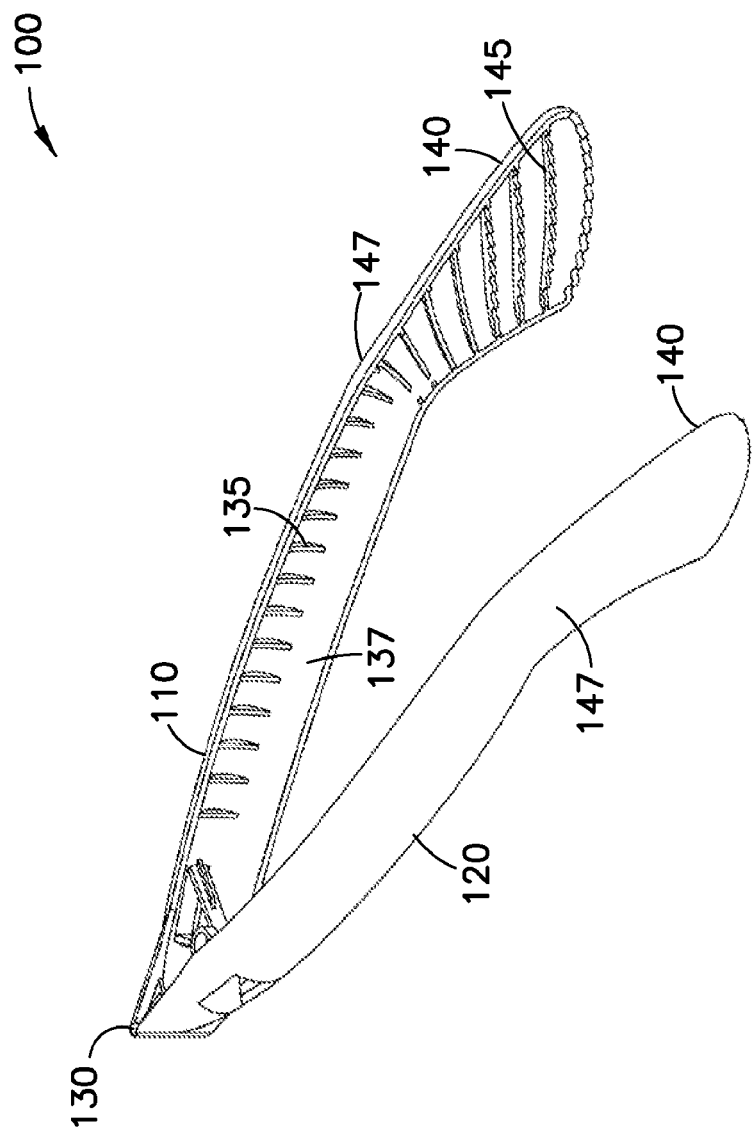
FIG. 1 shows a perspective view of an embodiment of folding plastic tongs for serving food items, depicted in a partially-folded position.

FIGS. 1-4 show an embodiment of folding plastic tongs 100 for serving food items. The tongs 100 have a pair of arms (110, 120) joined at a hinge 130 and extending in a lengthwise direction from the hinge 130. The tongs 100 are depicted in a partially-folded position but, as discussed in detail below, can open to a position in which the arms (110, 120) form at least an obtuse angle, e.g., at least an angle of 180 degrees. The arms (110, 120) have a non-planar, e.g., curved or arcuate, shape in a cross-section transverse to the lengthwise direction (see, e.g., FIGS. 1 and 4). The curved shape may extend along an entire length of the arms (110, 120), except for the portion near the hinge 130, which is flat. In some embodiments, the arms (110, 120) may be curved only along a portion of their length, such as, for example, along at least a portion (e.g., a majority) of a length of the arms.

The tongs 100 may be formed, for example, of polypropylene. The tongs 100 can be formed by various processes, including, for example, injection molding. The tongs 100 may be produced in various lengths depending on the particular end-user application, such as, for example, a folded-configuration length of 6", 9", or 12".

Ribs 135 may be formed on the inner surfaces 137 of the arms (110, 120) to provide additional strength and rigidity, with the ribs 135 being spaced along the length of the arms. Alternatively, the ribs may be omitted and additional strength may be achieved by increasing the wall thickness of the arms (110, 120).

Opposed gripping portions 140 are formed at the ends of each of the arms (110, 120). The gripping portions 140 allow food items to be easily gripped and picked up using the tongs 100. The gripping portions 140 are specifically configured to enable food items of a variety of shapes, weights, and textures to be grasped and picked up using the tongs 100. For example, the gripping portions 140 may widen as they extend from the ends of the arms (see, e.g., FIGS. 1 and 3) to allow sufficient quantities of loose food items, e.g., salad, to be grasped. The wider surface area of the gripping portions 140 also helps distribute the applied force to prevent damage to delicate food items, such as, for example, sandwiches and potato chips.

The gripping portions 140 may also have furrowed ribs 145 extending across their width to improve gripping characteristics for food items which are wet and/or slippery, such as, for example, noodles, pasta, and salad. The gripping portions 140 also may be angled with respect to the lengthwise direction of the arms (110, 120). The user may grip the tongs 100 with one hand, applying a thumb on the outer surface 147 of one arm and one or more fingers on the outer surface 147 of the other arm. In this configuration, the angled gripping portions 140 will extend downward to facilitate picking up food items.

The hinge 130 which joins the arms (110, 120) may have a linear region 132 (see FIG. 8) of reduced thickness formed between the arms (110, 120) and oriented transversely relative to the lengthwise direction of the arms. The reduced thickness of the linear region 132 allows the plastic material to bend easily, thereby allowing relative angular movement of the arms (110, 120). The hinge 130 is configured to allow the arms (110, 120) to move from a position in which one of the arms 110 forms at least an obtuse angle with the other arm 120, e.g., an angle of at least about 180 degrees, to a nearly-closed position. In the nearly-closed position, the arms are connected by an additional mechanism, i.e., in addition to being connected by the hinge, as discussed in further detail below.

This arrangement results in a hinge 130 which exhibits little or no resistance to opening and closing movement of the arms (110, 120). Consequently, the hinge 130 itself is not a significant source of opening or closing force for the arms (110, 120). In other words, the hinge 130 does not exert much of a spring-like force on the arms (110, 120). This means that the arms (110, 120) swing relatively freely to the fully-open position, i.e., the position at which the arms (110, 120) form an angle of about 180 degrees, when the arms (110, 120) are not connected to one another (except by the hinge itself). However, one of ordinary skill in the art would understand that the plastic material in the linear portion 132 of reduced-thickness forming the hinge 130 would have some elasticity.

Figure 5A:
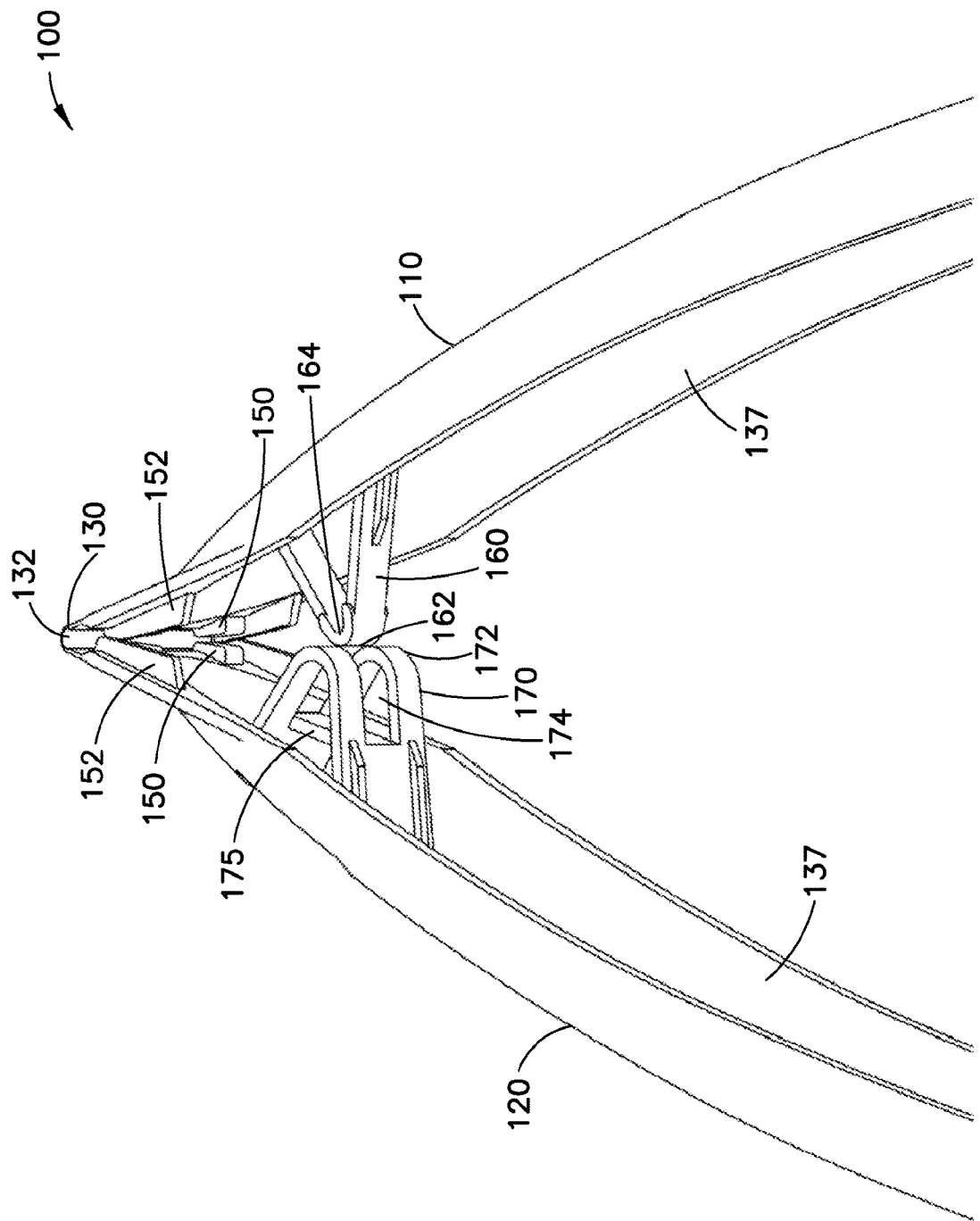
FIG. 5A shows an enlarged partial perspective view of the hinged-portion of the tongs, depicted in an unlatched position.
Figure 5B:
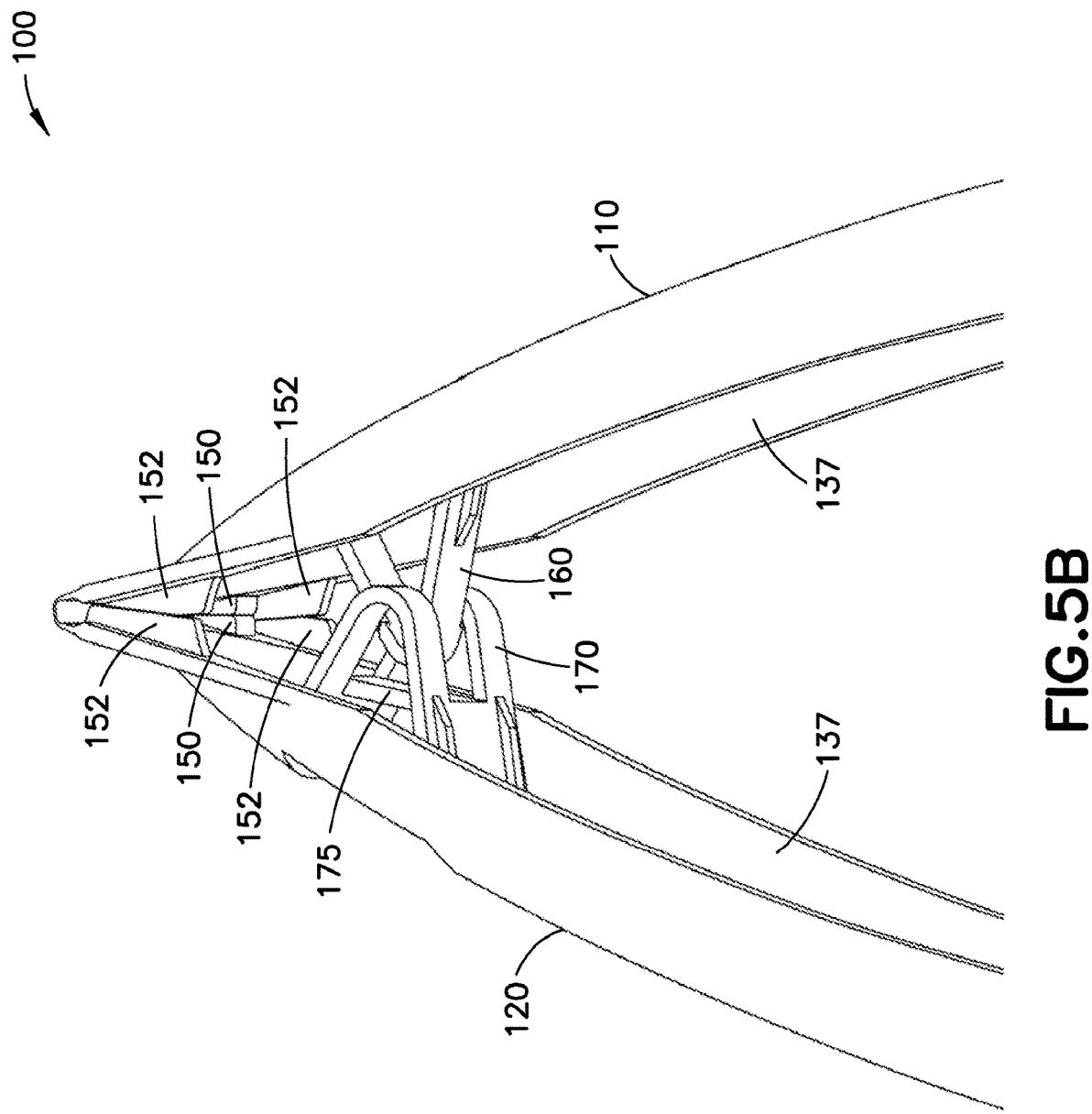
FIG. 5B shows an enlarged partial perspective view of the hinged-portion of the tongs, depicted in a latched position.

As shown in FIGS. 5A and 5B, one or more wedge-shaped bosses 150 may be formed in corresponding positions on the inner surfaces of the arms (110, 120) so as to prevent the hinge 130 from closing completely without adding resistance. The bosses 150 on opposing sides will contact and prevent the hinge surfaces from contacting one another without resistance (see also FIG. 8). The bosses 150 thereby act as part of a spring mechanism for the closing movement of the arms (110, 120) (the other aspects of the spring mechanism being discussed below). Force applied to the arms (110, 120) after the opposing bosses 150 contact one another will cause the arms to flex against each other until the opposing gripping portions 140 contact each other.

Figure 2:
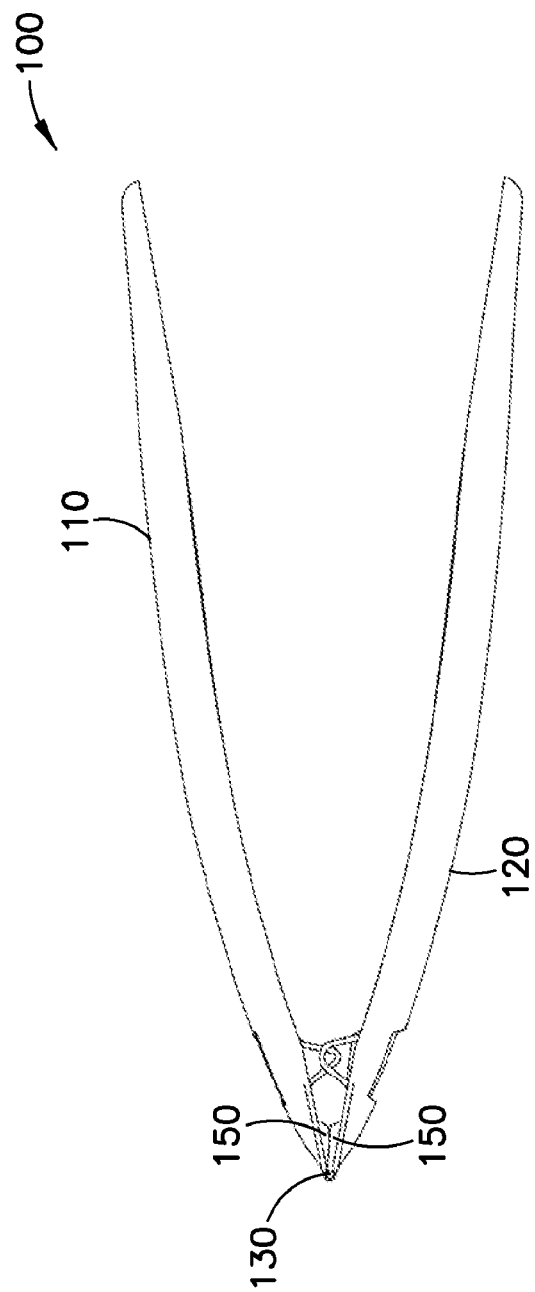
FIG. 2 shows a top view of the tongs, depicted in a partially-folded position.
Figure 8:
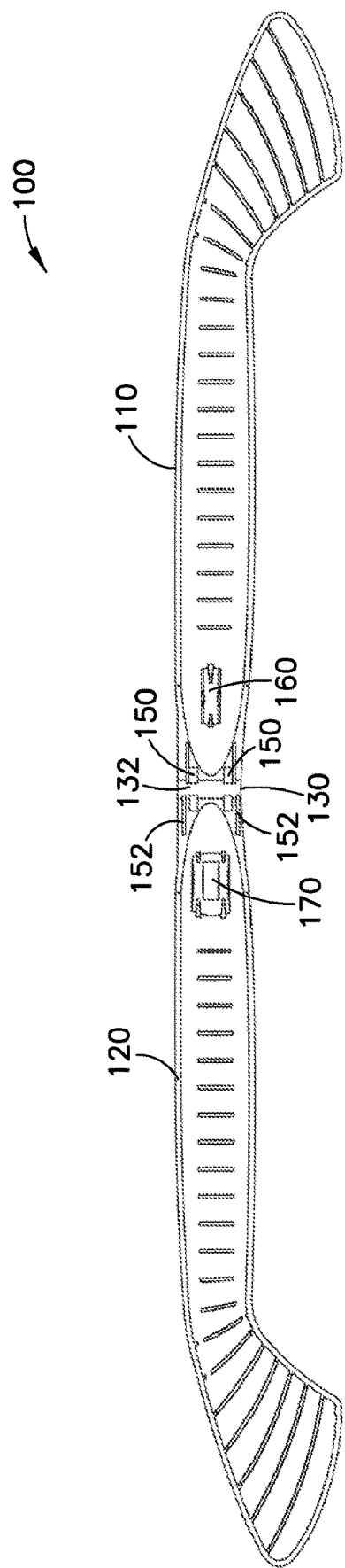
FIG. 8 shows an inside view of the tongs, depicted in a fully unfolded position.
Figure 9:
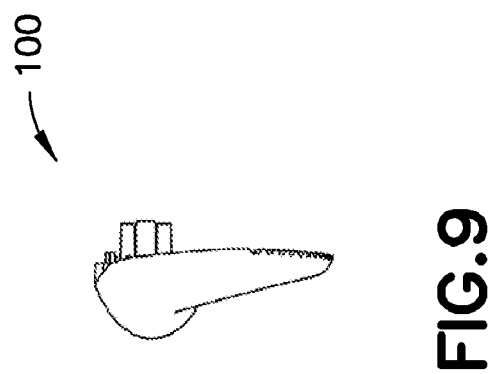
FIG. 9 shows a front view of the tongs, depicted in a fully unfolded position.

Particular embodiments may include one or more wedge-shaped fins 152 on the inner surfaces of the arms (110, 120) to help align the arms and prevent sideways (i.e., transverse to the length direction of the arms) deflection and movement (see also FIGS. 2 and 8). Pairs of the wedge-shaped fins 152 may be positioned outside of the wedge-shaped bosses 150 in the transverse direction. Furthermore, the wedge-shaped fins 152 on one arm 110 may be offset in the transverse direction with respect to the wedge-shaped fins 152 of the other arm 120 so that the edges of the wedge-shaped fins 152 do not align. Furthermore, the wedge-shaped fins 152 are positioned such that side faces of the wedge-shaped fins 152 can come into contact to provide resistance to transverse forces applied to the arms.

FIGS. 5A and 5B show enlarged partial perspective views of the hinged-portion of the tongs 100, depicted in an unlatched position and a latched position, respectively. As explained in further detail below, the tongs 100 may be packaged for sale and/or shipment in a "fully-opened" or "fully-unfolded" configuration in which the arms (110, 120) form an angle of about 180 degrees.

To use the tongs 100 for serving food items, the arms (110, 120) must be folded from the fully-unfolded position to a partially-folded position at which point connection between the arms (110, 120) is established by way of protrusions (160, 170) which extend from the inner surfaces 137 of the arms. A first protrusion 160 extends from an inner surface 137 of one of the arms (110) and a second protrusion 170 extends from an inner surface 137 of the other arm (120). The first protrusion 160 and the second protrusion 170 are configured to connect to each other to restrain an opening movement of the arms (110, 120) and may optionally be configured to disconnect from one another to allow an opening movement of the arms.

In particular embodiments, the first protrusion 160 may be formed by an A-shaped member which extends so that a peak 162 thereof is pointed in a direction of the second protrusion 170. The shape may be referred to as "A-shaped" because, in the embodiment depicted in FIGS. 5A and 5B, the first protrusion 160 is formed by two surfaces (e.g., approximately planar surfaces) which extend from the inner surface 137 of the arm 110 and meet at a peak 162. In other words, the two surfaces form a somewhat triangularly-shaped protruding element—although with a rounded peak, as opposed to a point. The second protrusion 170 may also have an A-shaped member which extends so that a peak 172 thereof is pointed in a direction of the first protrusion 160.

The peak 162 of the first protrusion 160 may be configured to fit into a slot 174 in the peak 172 of the second protrusion 170. The peak 172 of the second protrusion 170 may be significantly more rounded than the peak 162 of the first protrusion 160. The first protrusion 160 may include tabs 164 at the peak 162 thereof which form a snap connection with the edge of the slot 174 (see FIG. 5B). More generally, the connection between the arms (110, 120) may be described as follows. A portion of the first protrusion 160 may be configured to fit into a receptacle (e.g., a slot 174 or other type of opening) in the second protrusion 170. The first protrusion 160 may have one or more elements which form a snap connection with the receptacle in the second protrusion 170.

In particular embodiments, the first protrusion 160 and the second protrusion 170 cooperate to limit and control a closing movement of the arms (110, 120). For example, the second protrusion 170 may have a spring surface 175 positioned within an interior volume and positioned to act as a stop and/or a spring for the inserted first protrusion 160. The spring surface 175 may be positioned, for example, approximately at a mid-point of the height of the second protrusion 170. In such a case, when the first protrusion 160 and the second protrusion 170 are connected, the arms (110, 120) have a range of movement between a closing spring position and a more open position at which the first protrusion 160 and the second protrusion 170 connect (as shown, e.g., in FIG. 5B). When the arms (110, 120) are at the closing spring position, the spring surface 175 is elastically bendable to allow the arms to reach a more closed position where the gripping portions 140 meet one another (the arms are also somewhat elastically bendable). The characteristics of the spring surface 175, e.g., thickness and position relative to the peak of the protrusion 170, may be selected to provide a particular amount of tension and spring elasticity so as to provide a particular "feel" for the user of the tongs.

As shown, for example, in FIGS. 6-9, the tongs 100 may be packaged for sale and/or shipment in a "fully-opened" or "fully-unfolded" configuration in which the arms (110, 120) form an angle of about 180 degrees. One of ordinary skill in the art would understand that the angle between the arms (110, 120) need not be precisely 180 degrees for the tongs 100 to be properly packaged. For example, the hinge 130 may open or close somewhat from the completely flat position of 180 degrees due to ordinary bending and flexing of the plastic material. Thus, in practice, the angle between the arms (110, 120) in the fully-unfolded position may vary, e.g., by about 5, 10 or 20%, from 180 degrees (depending, e.g., on how many tongs 100 are packaged together).

Figure 3:
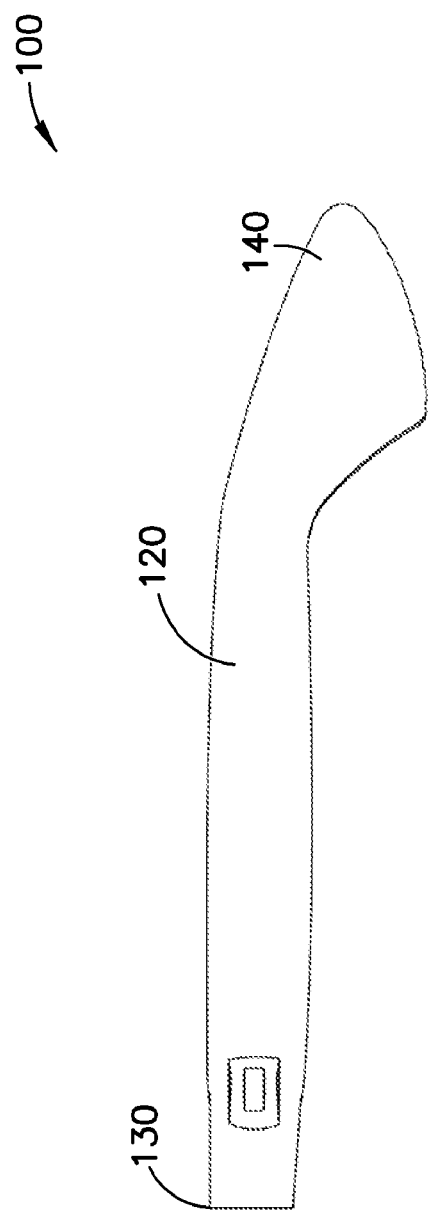
FIG. 3 shows a side view of the tongs, depicted in a partially-folded position.
Figure 4:
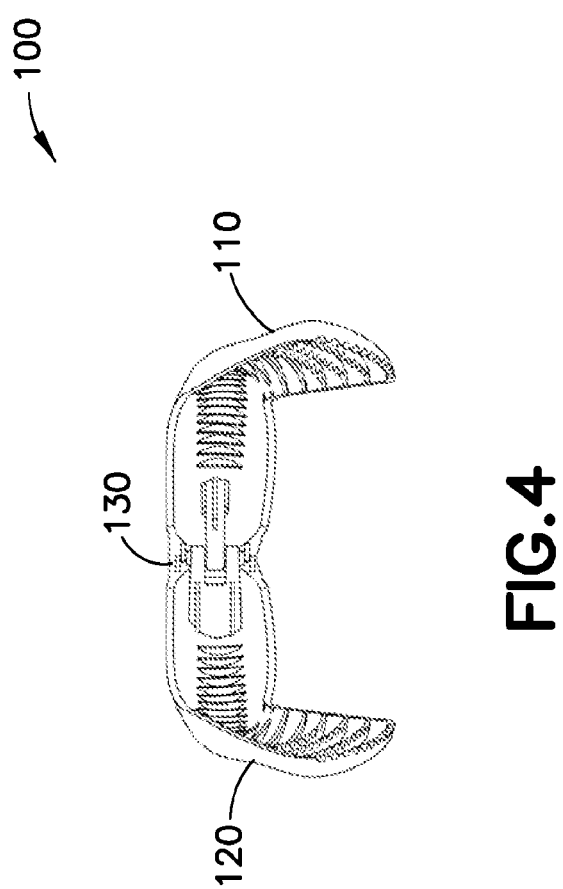
FIG. 4 shows a front view of the tongs, depicted in a partially-folded position.
Figure 6:
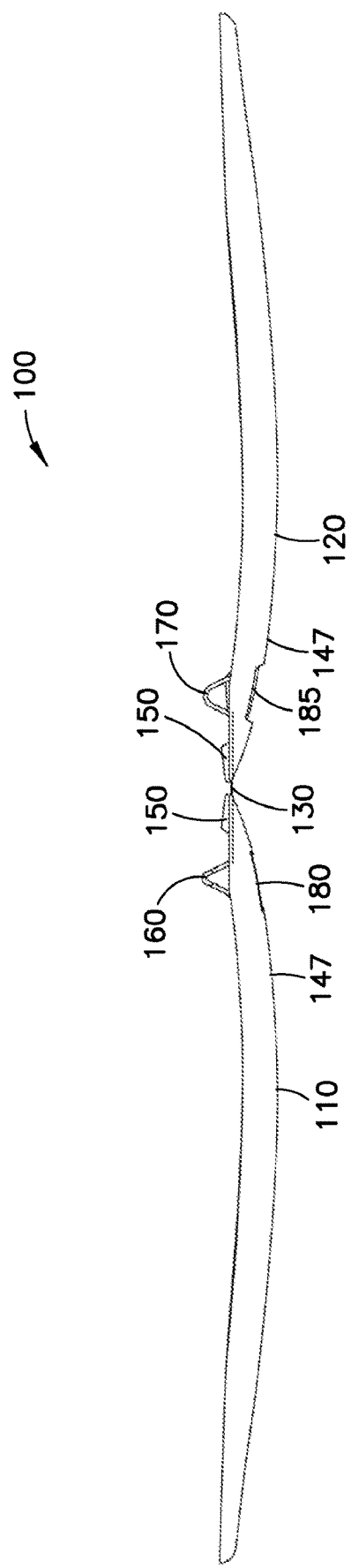
FIG. 6 shows a top view of the tongs, depicted in a fully unfolded position.
Figure 7:
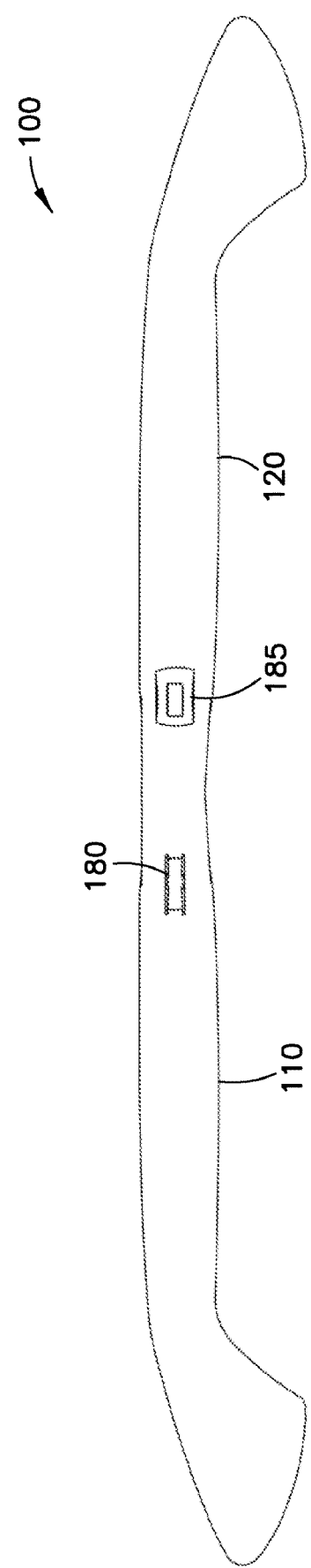
FIG. 7 shows an outside view of the tongs, depicted in a fully unfolded position.

FIGS. 6-8 show that the arms (110, 120) each may have an opening (180, 185) formed in alignment with the first and second protrusions, respectively (see also, FIGS. 1 and 3). The openings (180, 185) may be formed such that a volume within each of the first and second protrusions (160, 170) is open to an outer surface 147 of each of the first and second arms (110, 120). In other words, there may be a volume inside each of the "A-shaped" protrusions which is open to the outside surface of the tongs. The volume within each protrusion is not necessarily an enclosed volume. Rather, the protrusions may be structures which are open on the sides, as depicted in FIGS. 5A and 5B.

Figure 10:
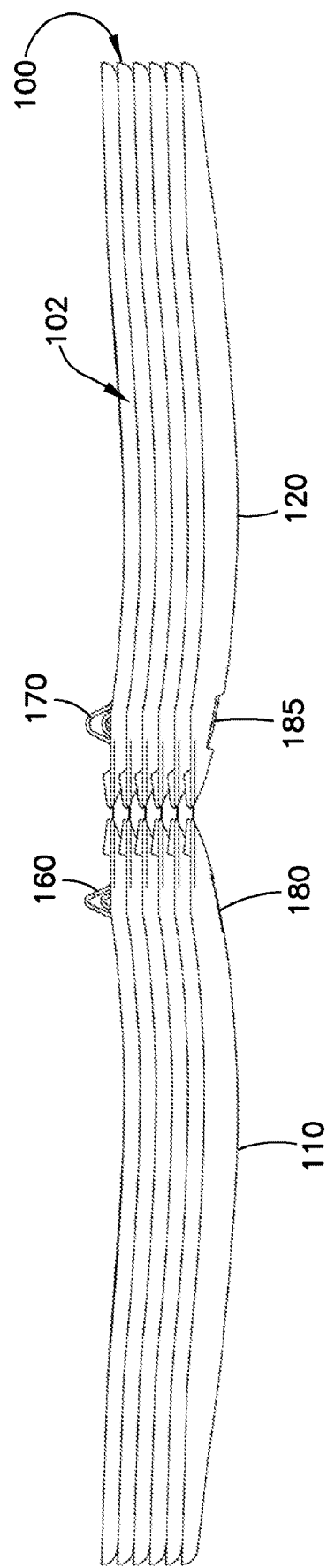
FIG. 10 shows a view of a plurality of tongs in a fully-unfolded, stacked configuration.

As shown in FIG. 10, the tongs 100 may be nestable when in a position in which the first arm 110 forms an angle with the second arm 120 of about 180 degrees. In this nested configuration, the first and second protrusions (160, 170) of the tongs 100 fit within the corresponding volumes within the first and second protrusions of an adjacent pair of tongs 102. This allows the tongs (100, 102) to nest very closely and efficiently. As can be seen in FIG. 10, that tongs (100, 102) are nested closely enough that the curved arms of one pair of tongs 102 fit within a volume defined by the curved arms of another pair of tongs 100. The close nesting allows the tongs to be packaged and shipped very efficiently.

The configuration of the tongs 100 which allows for them to be packaged for sale and/or shipment in a "fully-opened" or "fully-unfolded" configuration in which the arms (110, 120) form an angle of about 180 degrees is also advantageous during the manufacturing process. If, for example, an injection molding process is used, then the tongs may be formed in the fully-unfolded position, which means that the shape of the injection molding cavity will have a substantially flat profile. Also, the design of the mold, and the processes for maintenance of the mold, will be efficient and simple. In addition, the manufactured tongs can be placed in the fully-unfolded, nested configuration for packaging and shipment without further manipulation or assembly steps.

Although example embodiments have been shown and described in this specification and figures, it would be appreciated by those skilled in the art that changes may be made to the illustrated and/or described example embodiments without departing from their principles and spirit.

What is claimed is:

1. Folding plastic tongs for serving food items, the tongs comprising:
    a first arm and a second arm joined at a hinge and extending in a lengthwise direction from the hinge, the first and second arms having a non-planar shape in a cross-section transverse to the lengthwise direction, along at least a portion of a length of the first and second arms;
    a first protrusion extending from an inner surface of the first arm and a second protrusion extending from an inner surface of the second arm, the first protrusion and the second protrusion being configured to connect to each other to restrain an opening movement of the first and second arms;
    gripping portions formed at ends of each of the first and second arms,
    wherein the hinge is configured to allow the first and second arms to open to a position such that the first arm forms at least an obtuse angle with the second arm when the first protrusion and the second protrusion are not connected, and
    wherein the tongs are nestable with another pair of tongs, when in a position in which the first arm forms an angle with the second arm of about 180 degrees, such that the first and second protrusions of the tongs fit within corresponding openings of the second pair of tongs.

2. The folding plastic tongs of claim 1, wherein a portion of the first protrusion is configured to fit into a receptacle in the second protrusion, the first protrusion comprising one or more elements which form a snap connection with the receptacle in the second protrusion.

3. The folding plastic tongs of claim 1, wherein the hinge is configured to allow the first and second arms to open to a position such that the first arm forms an angle of at least about 180 degrees with the second arm when the first protrusion and the second protrusion are not connected.

4. The folding plastic tongs of claim 1, wherein the first and second arms each comprise an opening formed in alignment with the first and second protrusions, respectively, such that a volume within each of the first and second protrusions is open to an outer surface of each of the first and second arms.

5. The folding plastic tongs of claim 1, wherein the first protrusion comprises an A-shaped member which extends so that a peak thereof is pointed in a direction of the second protrusion, and the second protrusion comprises an A-shaped member which extends so that a peak thereof is pointed in a direction of the first protrusion.

6. The folding plastic tongs of claim 5, wherein the peak of the first protrusion is configured to fit into a slot in the peak of the second protrusion, the first protrusion comprising tabs at the peak thereof which form a snap connection with an edge of the slot.

7. The folding plastic tongs of claim 1, wherein the first protrusion and the second protrusion cooperate to control a closing movement of the first and second arms.

8. The folding plastic tongs of claim 7, wherein when the first protrusion and the second protrusion are connected, the first and second arms have a range of movement between a position where the first protrusion and the second protrusion form a snap connection in a closing of the arms and a closing spring position.

9. The folding plastic tongs of claim 7, wherein when the first and second arms are at the closing spring position, the peak of the first protrusion contacts a spring surface within the second protrusion, the spring surface being elastically bendable to allow the first and second arms to reach a more closed position where the gripping portions meet one another.

10. The folding plastic tongs of claim 1, wherein the gripping portions widen as the gripping portions extend from the ends of the first and second arms.

11. The folding plastic tongs of claim 1, wherein the gripping portions are angled with respect to the lengthwise direction of the first and second arms.

12. The folding plastic tongs of claim 1, wherein the gripping portions each comprise a plurality furrowed ribs extending across a width of each of the gripping portions.

13. The folding plastic tongs of claim 1, wherein the hinge comprises a linear region of reduced thickness formed between the first and second arms and oriented transversely relative to the lengthwise direction.

14. The folding plastic tongs of claim 1, further comprising one or more wedge-shaped bosses formed in corresponding positions on the inner surfaces of the first and second arms so as to prevent the hinge from closing completely.

15. The folding plastic tongs of claim 1, wherein the first and second arms have a curved shape in a cross-section transverse to the lengthwise direction, along at least a majority of the length of the first and second arms.

16. The folding plastic tongs of claim 1, further comprising a plurality of ribs formed on the inner surfaces of the first and second arms, the ribs being spaced along the length of the first and second arms.

17. The folding plastic tongs of claim 1, wherein the tongs are formed of polypropylene by injection molding.

* * * * *